United States Patent Office 3,312,675
Patented Apr. 4, 1967

3,312,675
CHLORO (OR BROMO) TRICHLOROMETHYL-NORCAMPHANYL ESTERS OF ACRYLIC AND METHACRYLIC ACIDS AND POLYMERS THEREOF
John R. Caldwell, Winston J. Jackson, Jr., and Edward H. Hill, Kingsport, Tenn., assignors to Eastman Kodak Company, Rochester, N.Y., a corporation of New Jersey
No Drawing. Filed Aug. 9, 1963, Ser. No. 301,186
11 Claims. (Cl. 260—80.5)

This invention is concerned with the preparation and polymerization of new vinyl monomers to new polymeric materials having reduced flammability and other unexpected and exceptional properties and which can be made into films, fibers, and molded objects. It is especially concerned with the preparation and polymerization of chloro (or bromo) trichloromethylnorcamphanyl esters of acrylic and methacrylic acids.

The literature in the polymer chemistry field contains much data showing that bulky side groups on a polymer chain tend to lower the softening point by interfering with orderly packing of the molecules. This is a general rule in polymer chemistry and is applicable to vinyl polymers and also to condensation polymers. Selections from such literature are listed below.

Fibers from Synthetic Polymers, R. Hill, 1953, page 54: "The general effect of the addition of side groups to the ethylene polymer chain is to reduce crystallinity and to reduce the melting point. Ethylene interpolymers with, for example, vinyl acetate, are hence more rubber-like than pure ethylene polymers and are of little interest as fibre-forming polymers." On page 319 of this reference it is shown that the introduction of side chains lowers the melting point of polyesters.

Probably the most pertinent reference, and one which bears directly on the present case, is the work of Wiley and Brauer, J. Polymer Sci., 3, 455, 647 (1948); 4, 351 (1949). Data on the second order transition temperature of homologous acrylate and methacrylate polymers are given. It is shown that the second order transition temperature is depressed as the bulk of the side group is increased. The softening point is similarly depressed. Some of the values are cited below:

| Polyacrylate type: | Sec. ord. tr. temp., ° C. |
|---|---|
| Methyl | 0 |
| Ethyl | —23 |
| n-Propyl | —51.5 |
| n-Butyl | —70 |
| Polymethacrylate type: | |
| Methyl | 72 |
| Ethyl | 47 |
| n-Propyl | 33 |
| n-Butyl | 17 |
| n-Octyl | —70 |
| n-Decyl | —70 |

It is thus clearly shown that, as the bulk of the side group is increased, the softening point is decreased. Hence, it is taught in the art that an increase in the bulk of a side group in a vinyl polymer will result in a lower softening point.

Objects of the present invention are: to provide vinyl polymers having large molecules in the side chains thereof and exhibiting high degrees of thermal, hydrolytic and weathering stability; to build into these polymers high resistance to ignition and a high degree of self-extinguishing capacity; to provide vinyl polymers having such improved thermal stability as to render practical their processing at relatively high temperatures; to provide vinyl polymers having greatly improved scuff resistance; to provide the aforesaid polymers with such characteristics that they may be extruded by the usual methods to give films, rods and other shaped products, and may be molded by injection or compression methods; and to provide intermediate compounds useful in the preparation of the aforesaid polymers.

These and other objects as may hereinafter become evident have been achieved according to the present invention by the discovery that certain halogenated compounds when reacted with norcamphane rings, themselves forming side chains in vinyl polymers, imparts unexpectedly high degrees of thermal and hydrolytic stability to the polymer. These unexpected results are even more striking when one is confronted with the well known fact that alkyl halides when incorporated into polymer chains tend to reduce the polymer stability under thermal and hydrolytic influences. Exemplary of this unstabilizing effect are the vinyl chloride homo- and copolymers.

The invention may be illustrated by the following preparation of the vinyl monomers:

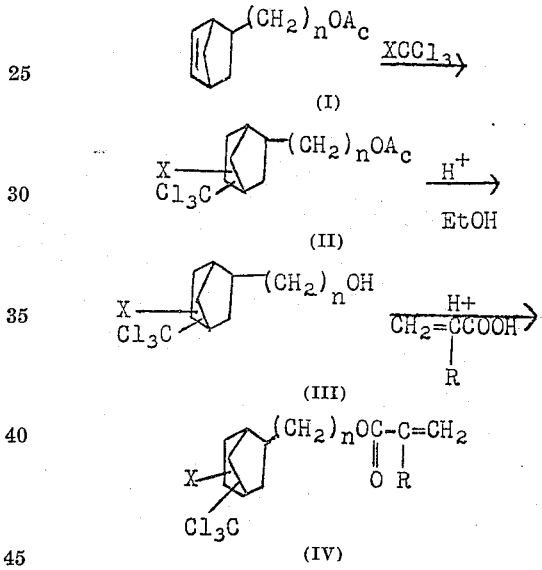

wherein $n=0$ or 1, $X=Cl$ or $Br$, $R=H$ or $CH_3$, and $$Ac = CH_3\overset{O}{\underset{\|}{C}}-$$

When $n=0$, starting compound I is the Diels-Alder adduct of cyclopentadiene and vinyl acetate. When $n=1$, it is the adduct of cyclopentadiene and allyl acetate. These adducts are prepared by heating dicyclopentadiene with the acetate in an autoclave at 200–230° C.

Intermediate compound II is obtained by the addition of carbon tetrachloride or bromotrichloromethane across the double bond of I. This reaction is catalyzed by free radical catalysts such as benzoyl peroxide, acetyl peroxide or azobis (isobutyronitrile) and by ultraviolet light. Compound II consists of an isomer mixture; positional isomers (chlorine or bromine in the 5- or 6-position and the trichloromethyl group in the remaining position) and geometrical isomers (halogen and trichloromethyl groups in the endo and/or exo positions relative to the methylene bridge of the ring). The isomer mixture comprises about 60–80 percent of the isomer having the —CCl$_3$ group in the 5 position, which is in accord with the recognized phenomenon that the largest group will prefer to attach at the greatest possible distance from the ester group on the norcamphane ring. This addition of halogenated compounds to olefins is described in detail in several papers, such as J. Org. Chem., 14, 239 (1949); Rec. trav.

chim., 70, 867 (1951); and J. Am. Chem. Soc., 82, 893 (1960).

The conversion of the acetate compound II to the carbinol compound III is accomplished by either hydrolysis or ester interchange. Ester interchange is preferred since the reaction can be followed by allowing the alkyl acetate which is formed to distill off. This reaction is carried out by refluxing a solution of compound II, ethyl alcohol, and hydrochloric acid. The product is an isomer mixture since the starting compound II is an isomer mixture. Other alcohols can be used instead of ethanol, e.g., methanol, isopropanol, and butanol. The use of these alcohols results in the formation of the corresponding methyl acetate, isopropyl acetate, and butyl acetate. Other acids can be used instead of hydrochloric acid, such as sulfuric acid, toluene sulfonic acid, or methylenedisulfonic acid.

The acrylate (IV, R=H) or methacrylate (IV, R=CH$_3$) is prepared by refluxing a mixture containing the corresponding acrylic or methacrylic acid, the carbinol (III), benzene, an acidic catalyst, and a polymerization inhibitor. The water formed by the reaction is removed in the benzene azeotrope and collected in a Dean-Stark trap. Benzene is the preferred solvent, but other solvents such as toluene, xylene, cyclohexane, and heptane may be employed. Satisfactory acidic catalysts are p-toluene sulfonic acid, sulfuric acid, or methylenedisulfonic acid. Effective polymerization inhibitors are methylene blue, cuprous chloride, copper tinsel, hydroquinone, and hydroquinone monomethyl ether. A slight excess of the acrylic or methacrylic acid is added to insure completion of the reaction. Since the esters are high boiling, they are not distilled. They can, however, be obtained pure enough to give high polymers. The esters consist of isomer mixtures since intermediates II and III are isomer mixtures.

The acrylate and methacrylate of 5 (and 6)chloro-6 (and 5) - trichloromethyl - 2 - norbornanol (IV, n=O, X=Cl), 5 (and 6)-chloro-6 (and 5)-trichloromethyl-2-norbornanemethanol (IV, n=1, X=Cl), and 5 and 6)-bromo-6 (and 5)-trichloromethyl-2-norbornanol (IV, n=0, X=Br), and 5 (and 6)-bromo-6- (and 5)-trichloromethyl - 2 - norbornanemethanol (IV, n=1, X=Br) homopolymerize readily. They also form interpolymers with a wide variety of compounds containing an ethylenic linkage. In general, useful polymers can be obtained with a monoethylenically unsaturated polymerizable compound containing a

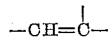

group or more specifically a

group. Another class of polymerizable compounds that is useful in the process of the invention contains the

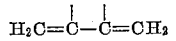

group. The aforesaid useable monoethylenically unsaturated compounds containing either

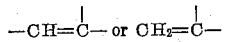

groups are described in U.S' Patent 2,396,785. See also the list of vinyl monomers described in U.S. Patent 2,737,369.

Examples of vinyl monomers that are suitable for the preparation of the present interpolymers include acrylic and methacrylic esters such as methyl acrylate, ethyl acrylate, butyl methacrylate, and methyl methacrylate. Derivatives of olefinic dibasic acids include maleates, maleamides, maleamates, and maleimides. The esters, amides, and ester-amides of fumaric, itaconic, and citraconic acids can also be used. Vinyl esters, vinyl ethers, and vinyl ketones can be employed. The vinyl derivatives of benzene are useful, as represented by styrene, α-methylstyrene, p-acetaminostyrene, p-methylstyrene, and α-acetoxystyrene. Acrylonitrile and methacrylonitrile are particularly useful. Representative halogen compounds include vinyl chloride, vinyl fluoride, vinylidene fluoride, tetrafluoroethylene, and chlorotrifluoroethylene. Other types of useful monomers include ethylene, isobutylene, N-vinyl imides, N-vinyl lactams, and isopropenyl acetate. The amides, N-alkyl amides, and N,N-dialkyl amides of acrylic and methacrylic acids are also used.

The above diolefinic compounds are useful in the present invention for the production of elastic or rubbery interpolymers. Suitable examples of diolefinic monomers are: butadiene, isoprene, 2,3-dimethylbutadiene, 2-chlorobutadiene, 2-cyanobutadiene, 2-phenylbutadiene, and 2-acetoxybutadiene.

The homopolymers and interpolymers of the invention are conveniently made by dispersing the monomers in water and adding suitable dispersing agents and catalysts. Satisfactory catalysts include sodium or ammonium persulfate, hydrogen peroxide, sodium perborate, etc. Catalysts that are soluble in the organic phase include benzoyl peroxide, acetyl peroxide, tert-butyl hydroperoxide, and azobis (isobutylronitrile). Representative dispersing agents for the production of emulsion polymers are sodium dodecyl sulfate, soaps, sulfonated mineral oil, sulfonated aromatic compounds, etc. The polymerization may also abe carried out in organic solvents such as the lower alcohols, ketones, or esters, Other solvents such as the aromatic or aliphatic hydrocarbons, dioxane, and the glycol monoethers may be employed. Mass or bulk polymerization may also be employed.

The following examples will further illustrate the invention.

(1) Preparation of 5 (and 6)-chloro-6 (and 5)-trichloromethyl-2-norbornanol (III, X=Cl, n=O). 5-nornen-2-ol acetate (I, n=O) was prepared by heating 1.0 mole of dicyclopentadiene with 2.2 moles of vinyl acetate in an antoclave at 230° C. for 6 hrs. The product, obtained in 50% yield, boiled at 78–80° C./15 mm. The 5 (and 6)-chloro-6 (and 5)-trichloromethyl-2-norbornanol acetate (II, X=Cl, n=O) was prepared by refluxing a solution containing 304 g. (2.0 moles) of the 5-norbornen-2-ol acetate, 924 g. (6.0 moles) of carbon tetrachloride, and 6.0 g. of benzoyl peroxide for 8 hrs. After the solution was washed with sodium bicarbonate solution and water, it was dried with sodium sulfate and distilled. The main fraction distilled at 140–150° C./2 mm. and consisted of an isomer mixture. On standing overnight it crystallized. The 5 (and 6)-chloro-6 (and 5)-trichloromethyl-2-norbornanol (III, X=Cl, n=O) was prepared by refluxing a solution containing 212 g. of the 5 (and 6)-chloro-6 (and 5)-trichloromethyl-2-norbornanol acetate, 500 ml. of ethanol, and 350 ml. of concentrated hydrochloric acid. An azeotrope containing ethyl acetate, ethanol, and water boiling at 65–69° C. was collected at the top of a 24-in. fractionating column attached to the flask. After 3 hrs. no more azeotrope was obtained. The solution was then cooled, diluted with 500 ml. of water, and extracted with ethylene dichloride. The extract was treated with decolorizing carbon, washed with sodium bicarbonate solution, dried with sodium sulfate, and distilled. The product, which weighed 125 g., boiled at 132–142° C./0.6 mm. It solidified to a low melting solid on cooling.

Analysis.—Calcd. for $C_8H_{10}Cl_4O$: C, 36.3; H, 3.8; Cl, 53.8. Found: C, 36.42; H, 3.95; Cl, 53.65.

(2) Preparation of 5 (and 6)-chloro-6 (and 5)-trichloromethyl-2-norbornanol acrylate (IV, X=Cl, n=O, R=H). A mixture containing 154 g. of the above carbinol, 58 g. of acrylic acid, 300 ml. of benzene, 7.0 g. of p-toluenesulfonic acid, 1.0 g. of methylene blue, 0.5 g. of cuprous chloride, and 2.0 g. of copper tinsel was refluxed for 12 hrs. The water formed in the reaction was collected in a Dean-Stark trap attached to the flask. The mixture was then cooled, filtered through a bed of Kleenflo to remove the methylene blue, washed with sodium bicarbonate solution, and dried with sodium sulfate. After removal of the benzene under reduced pressure at room temperature, a pale yellow oil was obtained which partially crystallized on standing. It consisted of an isomer mixture.

*Analysis.*—Calcd. for $C_{11}H_{12}Cl_4O_2$: C, 41.5; H, 3.8; Cl, 44.7. Found: C, 41.64; H, 3.92; Cl, 44.47.

(3) Preparation of 5 (and 6)-chloro-6 (and 5)-trichloromethyl-2-norbornanol methacrylate (IV, X=Cl, $n=0$, $R=CH_3$). This compound was prepared according to the procedure of Example 2, using methacrylic acid instead of acrylic acid. The product was a light yellow oil comprising an isomer mixture.

*Analysis.*—Calcd. for $C_{12}H_{14}Cl_4O_2$: C, 43.4; H, 4.2; Cl, 42.8. Found: C, 43.56; H, 4.31; Cl, 42.59.

(4) Preparation of 5 (and 6)-chloro-6 (and 5)-trichloromethyl-2-norbornanemethanol (III, X=Cl, $n=1$). 5-norbornen-2-methanol acetate (I, $n=1$) was prepared by heating 1.0 mole of dicyclopentadiene with 2.2 moles of allyl acetate in an autoclave at 200° C. for 6 hrs. The product boiled at 96–100° C./14 mm. This compound was treated with carbon tetrachloride by the procedure of Example 1. The product, an isomer mixture, boiled at 150–160° C./2 mm. By the ester interchange procedure in Example 1, it was converted to the carbinol, 5 (and 6)-chloro-6 (and 5)-trichloromethyl-2-norbornanemethanol, B. P. 155–162° C./1 mm.

*Analysis.*—Calcd. for $C_9H_{12}Cl_4O$: C, 38.9; H, 4.3; Cl, 51.1. Found: C, 38.12; H, 4.41; Cl, 50.95.

(5) Preparation of 5 (and 6)-chloro-6 (and 6)-trichloromethyl-2-norbornanemethanol acrylate (IV, X=Cl, $n=1$, R=H). This product, an isomer mixture, was prepared from the carbinol of Example 4 by procedure of Example 2. It was a light yellow oil.

*Analysis.*—Calcd. for $C_{12}H_{14}Cl_4O_2$: C, 43.4; H, 4.2; Cl, 42.8. Found: C, 43.29; H, 4.37; Cl, 42.64.

(6) Preparation of 5 (and 6)-chloro-6 (and 5)-trichloromethyl - 2 - norbornanemethanol methacrylate (IV, X=Cl, $n=1$, $R=CH_3$). This ester was prepared from the carbinol of Example 4 and methacrylic acid by the procedure of Example 2. The product was a light yellow oil comprising an isomer mixture.

(7) Preparation of 5 (and 6)-bromo-6 (and 5)-trichloromethyl-2-norbornanol acrylate (IV, X=Br, $n=0$, R=H). This product, an isomer mixture, was prepared according to the procedures of Examples 1 and 2 but using bromotrichloromethane instead of carbon tetrachloride. It was a yellow oil.

*Analysis.*—Calcd. for $C_{11}H_{12}BrCl_3O_2$: C, 36.5; H, 3.3; Br, 22.1; Cl, 29.4. Found: C, 36.8; H, 3.5; Br, 21.9; Cl, 29.5.

(8) Preparation of 5 (and 6)-bromo-6 (and 5)-trichloromethyl-2-norbornanemethanol methacrylate (IV, X=Br, $n=1$, $R=CH_3$). This product, an isomer mixture, was prepared according to the procedures of Examples 4 and 6 but using bromotrichloromethane instead of carbon tetrachloride. It was a yellow oil.

*Polymer preparation*

(9) The following materials were placed in a pressure bottle and tumbled at 50° C. for 24 hrs.:

| | | |
|---|---|---|
| 5 (and 6)-chloro-6 (and 5)-trichloromethyl-2-norbornanol acrylate | g | 85 |
| Methyl acrylate | g | 15 |
| Water | ml | 400 |
| Ammonium persulfate | g | 1.0 |
| Sodium bisulfite | g | 0.5 |
| Sodium lauryl sulfate | g | 3.0 |

The polymer was isolated by filtration and washed with water and ethyl alcohol. It weighed 92 g. and a chlorine analysis showed it contained 83.9% of the norbornanol acrylate. Clear, hard, self-extingishing films could be cast of the polymer from a methylene chloride solution. These films had a polymer melt temperature of 120–122° C.

(10) The following materials were placed in a pressure bottle and tumbled at 60° C. for 20 hrs.:

| | | |
|---|---|---|
| 5 (and 6)-chloro-6 (and 5)-trichloromethyl-2-norbornanol methacrylate | g | 17 |
| Butyl acrylate | g | 3.0 |
| Tert-butyl alcohol | ml | 100 |
| Azobisiobutyronitrile | g | 0.2 |

The polymer was isolated by pouring its solution (in the tert-butyl alcohol) into methanol with vigorous stirring. After drying, the polymer weighed 18.6 g. It was compression molded into buttons which had a heat distortion temperature of 132° C. at 66 p.s.i. The buttons were self-extinguishing.

(11) The following materials were placed in an autoclave and stirred at 60° C. for 48 hrs.:

| | | |
|---|---|---|
| 5 (and 6)-chloro-6 (and 5)-trichloromethyl-2-norbornanol acrylate | g | 60 |
| Butadiene | g | 40 |
| Water | ml | 400 |
| Soap | g | 10.0 |
| Ammonium persulfate | g | 1.0 |

A rubbery lump was obtained which was cut into small pieces and washed with isopropyl alcohol. The polymer weighed 88 g. and showed an improved flame resistance compared to polybutadiene.

(12) Using the method of Example 9, a copolymer was prepared having the composition of 86 parts 5 (and 6)-chloro-6 (and 5)-trichloromethyl-2-norbonanol acrylate, and 14 parts n-butyl methacrylate. Clear, flexible films could be cast of the polymer which were self-extinguishing.

(13) The following materials were placed in a pressure bottle and tumbled at 50° C. for 24 hrs.:

| | | |
|---|---|---|
| Acrylonitrile | g | 15 |
| 5 (and 6)-chloro-6 (and 5)-trichloromethyl-2-norbornanol methacrylate | g | 5 |
| Tert-butyl alcohol | ml | 100 |
| Acetyl peroxide | g | 0.2 |

The product precipitated as a white powder which was filtered and washed thoroughly with isopropyl alcohol. After drying, it weighed 18.9 g. and chlorine analysis showed it contained 24.4% of the methacrylate. The polymer was dissolved in dimethylformamide and wet-spun into fibers having the following properties:

2.4 g./den.
14% elongation
sticking point—185°–189° C.
flow point at 0.2 g./den.—180°–182° C.

(14) Using the method of Example 9, a copolymer was prepared comprising 50% vinylidene chloride and 50% 5 (and 6)-chloro-6 (and 5)-trichloromethyl-2-norboranol acrylate. Clear, self-extinshinging films could be cast of a dope of the polymer in methylene chloride solvent.

(15) Using the methotd of Example 9, a copolymer was prepared comprising 15% methyl acrylate and 85% 5 (and 6)-chloro-6 (and 5)-trichloromethyl-2-norbornanemethanol methacrylate. A film of this polymer had a polymer melt temperature of 124°–125° CC. They were self-extinguishing.

(16) Using the method of Example 13, a copolymer was prepared comprising 80% acrylonitrile and 20% 5 (and 6)-chloro-6 (and 5)-trichloromethyl-2-norbornanemethanol acrylate. It was dry-spun into yarn having the following properties:

3.1 g./den.
18% elongation
sticking point—189°–190° C.
flow point at 0.2 g./den.—179°–182° C.

(17) The following materials were placed in a pressure bottle and allowed to stand at 50° C. for 48 hrs.:

| | |
|---|---|
| 5 (and 6)-chloro-6 (and 5)-trichloromethyl-2-norbornanol acrylate _____g__ | 10 |
| Azobisisobutyronitrile _____g__ | 0.1 |

The clear, hard polymer obtained was dissolved in methylene chloride and precipitated in isopropyl alcohol. It was washed with more isopropyl alcohol, filtered and dried. The polymer had a polymer melt temperature of 160° C. and was self-extinguishing.

(18) Using the method of Example 17, the homopolymer of 5 (and 6)-bromo-6 (and 5)-trichloromethyl-2-norbornanol acrylate was prepared. The polymer was self-extinguished and had a polymer melt temperature of 165–167° C.

(19) The following materials were placed in a pressure bottle and tumbled at 60° C. for 24 hrs.:

| | |
|---|---|
| Methacrylonitrile _____g__ | 40 |
| 5 (and 6)-bromo-6 (and 5)-trichloromethyl-2-norcamphanemethanol methacrylate _____g__ | 60 |
| Acetone _____ml__ | 500 |
| Acetyl peroxide _____g__ | 1.0 |

A viscous dope was obtained which could be cast into clear, flexible films having a polymer melt temperature of 125–129° C. The films were self-extinguishing.

The invention has been described in detail with particular reference to preferred embodiments thereof but it will be understood that variations and modifications can be effected within the spirit and scope of the invention as described herein-above and as defined in the appended claims.

We claim:

1. A composition of matter comprising a mixture of compounds of the formulas

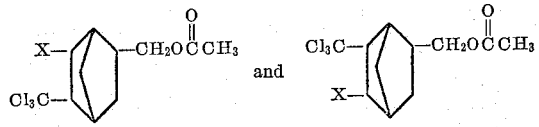

wherein in each formula X is selected from the group consisting of Cl and Br atoms.

2. A composition of matter comprising a mixture of compounds of the formulas

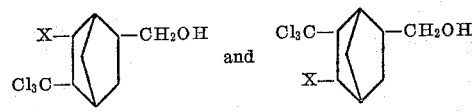

wherein in each formula X is selected from the group consisting of Cl and Br atoms.

3. The composition of matter comprising a mixture of compounds of the formulas

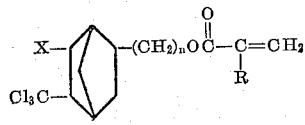

and

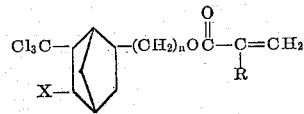

wherein in each formula n is selected from the group consisting of 0 and 1, X is selected from the group consisting of Cl and Br atoms, and R is selected from the group consisting of an H atom and a CH₃ radical.

4. A copolymer of the composition of matter of claim 3, said copolymer being capable of being formed into shaped articles.

5. A copolymer of compounds of the formulas

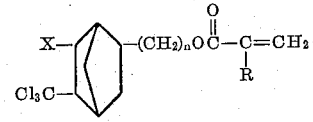

and

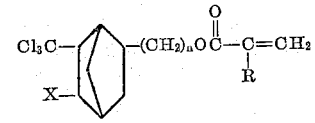

wherein in each formula n is selected from the group consisting of 0 and 1, X is selected from the group consisting of Cl and Br atoms, and R is selected from the group consisting of an H atom and a CH₃ radical, and at least one other ethylenically unsaturated compound selected from the group consisting of methyl acrylate, butyl acrylate, butadiene, n-butyl methacrylate, acrylonitrile, methacrylonitrile and vinylidene chloride, said copolymer being capable of being formed into shaped articles.

6. A copolymer of the composition of matter of claim 3 and at least one other ethylenically unsaturated compound, said copolymer being capable of being formed into shaped articles.

7. A copolymer of the composition of matter of claim 3 and methyl acrylate, said copolymer being capable of being formed into shaped articles.

8. A copolymer of the composition of matter of claim 3 and butadiene, said copolymer being capable of being formed into shaped articles.

9. A copolymer of the composition of matter of claim 3 and acrylonitrile, said copolymer being capable of being formed into shaped articles.

10. A copolymer of the composition of matter of claim 3 and methacrylonitrile, said copolymer being capable of being formed into shaped articles.

11. A copolymer of the composition of matter of claim 3 and vinylidene chloride, said copolymer being capable of being formed into shaped articles.

References Cited by the Examiner

UNITED STATES PATENTS 3,085,885   4/1963   Caldwell _____ 260—488

JOSEPH L. SCHOFER, *Primary Examiner.*

H. I. CANTOR, *Assistant Examiner.*